United States Patent [19]

Faxon, Sr.

[11] Patent Number: 4,870,882
[45] Date of Patent: Oct. 3, 1989

[54] RADIAL ARM SAW CONTROL MECHANISM

[75] Inventor: Robert L. Faxon, Sr., P.O. Box 17064, Pensacola, Fla. 32522

[73] Assignees: Albert David Kyte; Robert L. Faxon, Sr., both of Pensacola, Fla.

[21] Appl. No.: 233,225

[22] Filed: Aug. 18, 1988

[51] Int. Cl.$^4$ .......................... B27B 5/20; B23D 45/02
[52] U.S. Cl. .................................. 83/471.3; 83/486.1; 83/488; 83/614; 83/800
[58] Field of Search ............... 83/471.3, 471.2, 483, 83/835, 139, 689, 684, 686, 687, 688, 658, 685, 483, 485, 486, 523, 488, 477.2, 486.1, 487, 570, 581, 613, 614, 635, 639, 800

[56] References Cited

U.S. PATENT DOCUMENTS

| 2,172,274 | 9/1939 | Crouch ............................ 83/488 X |
| 2,773,524 | 12/1956 | Schutz et al. . | |
| 2,873,508 | 2/1959 | Candler . | |
| 3,090,269 | 5/1963 | Porter . | |
| 3,603,360 | 9/1971 | Botefuhr . | |
| 3,789,279 | 1/1974 | Dempsey et al. ..................... 318/39 |
| 3,910,142 | 10/1975 | Jureit et al. ........................ 83/471.3 |
| 4,131,143 | 12/1978 | Mayo ................................. 83/488 X |
| 4,534,247 | 8/1985 | Taguchi .............................. 83/617 |
| 4,590,831 | 5/1986 | Brodin .............................. 83/471.3 |

FOREIGN PATENT DOCUMENTS 2265486 10/1975 France ................................ 83/488

Primary Examiner—Donald R. Schran
Attorney, Agent, or Firm—Jacox & Meckstroth

[57] ABSTRACT

Mechanism for controlling the rate of travel of a saw as the saw operates and travels upon a radial arm. A housing contains fluid and an axially movable piston and piston rod. A wheel is operably joined to the piston rod and is connected to the piston rod so that the piston rod moves axially as the wheel rotates. A cable is wound upon the wheel and extends from the wheel and is connected to the saw. As the saw is moved upon the radial arm the cable rotates the wheel, and the wheel forces axial movement of the piston rod and the piston. Movement of the piston forces movement of fluid within the housing. The pressure of the fluid controls the rate of axial movement of the piston and the piston rod and controls the rate of rotary movement of the wheel. Thus, the rate of travel of the cable and the rate of travel of the saw are controlled by the rate at which the piston travels as the piston moves fluid within the housing.

26 Claims, 4 Drawing Sheets

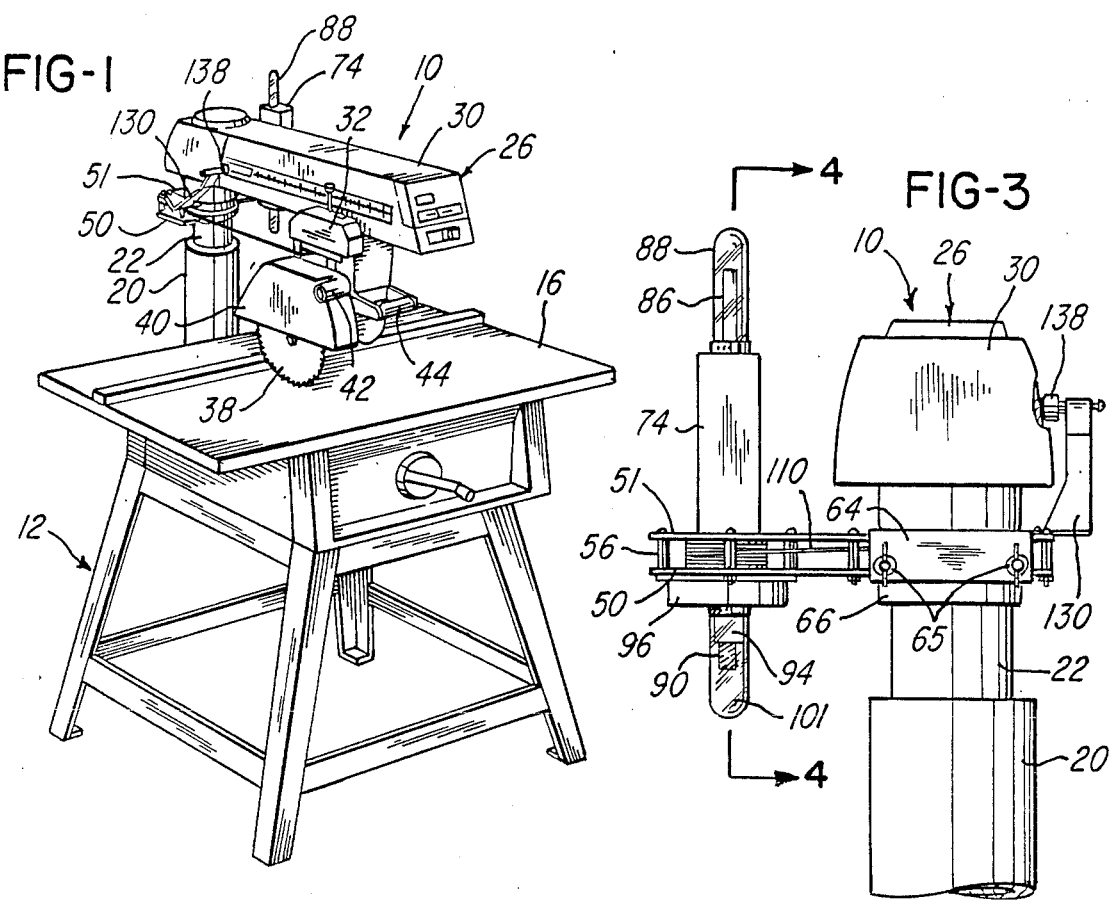
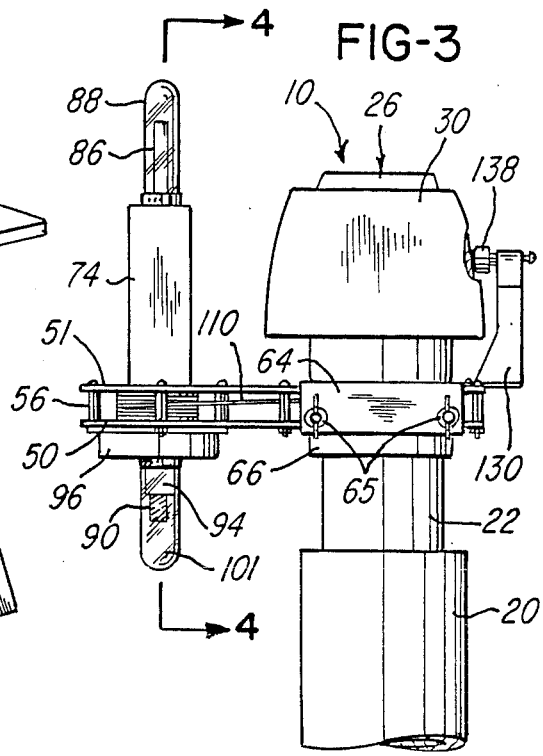
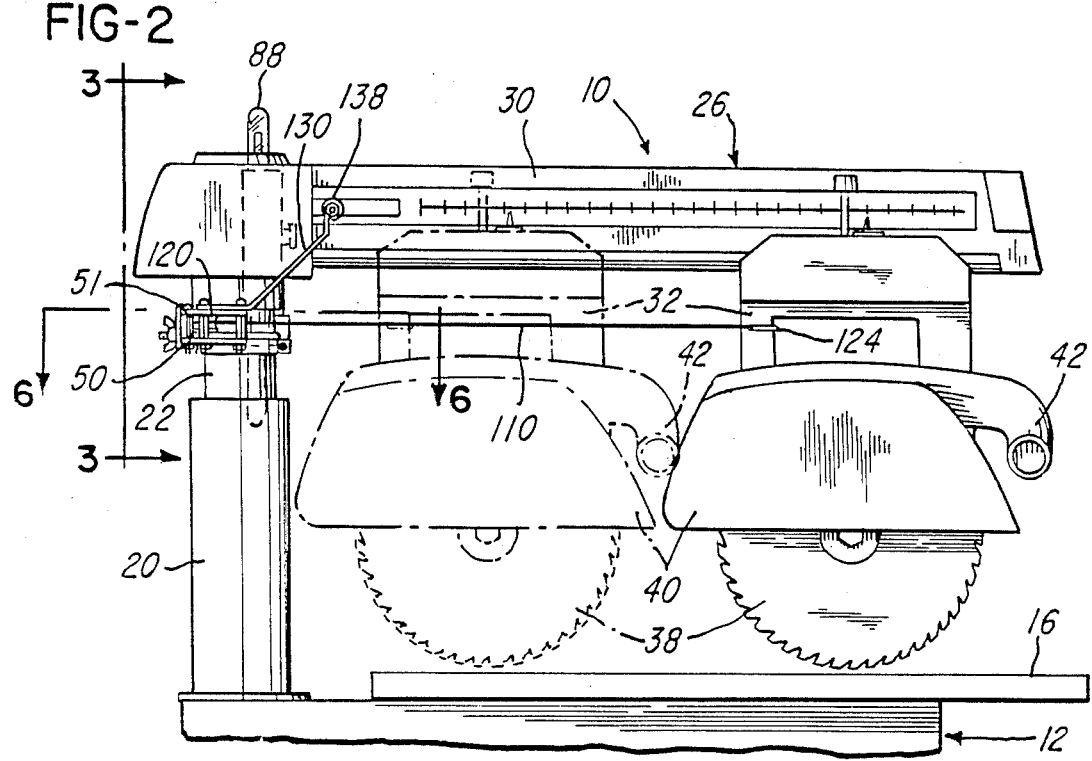

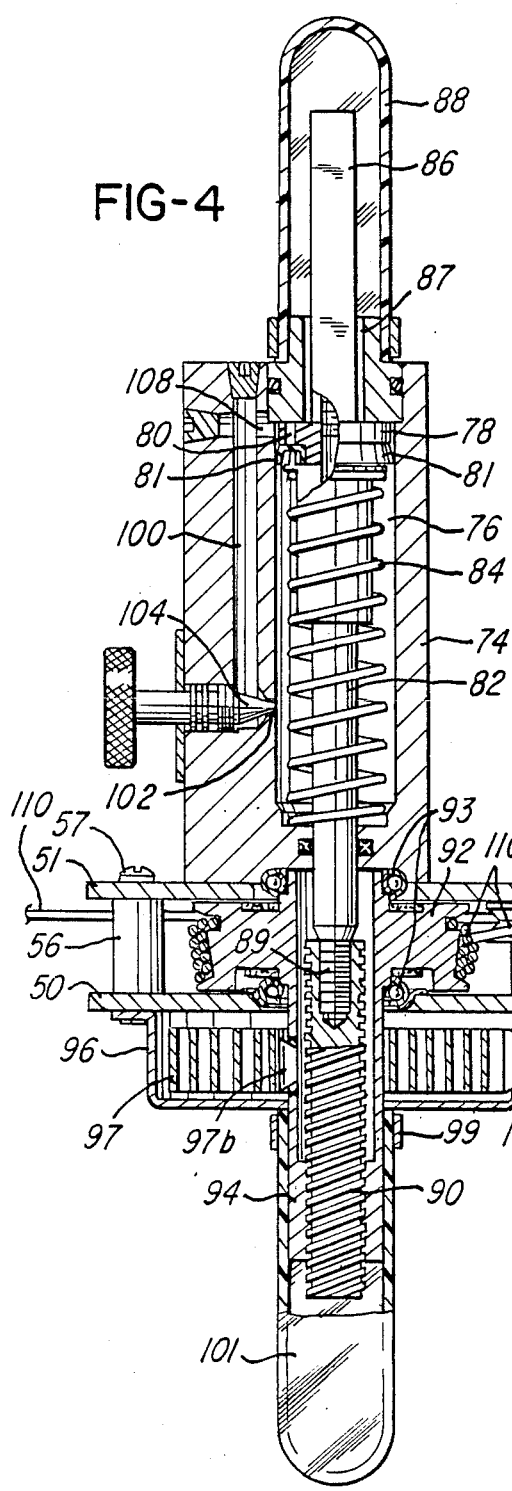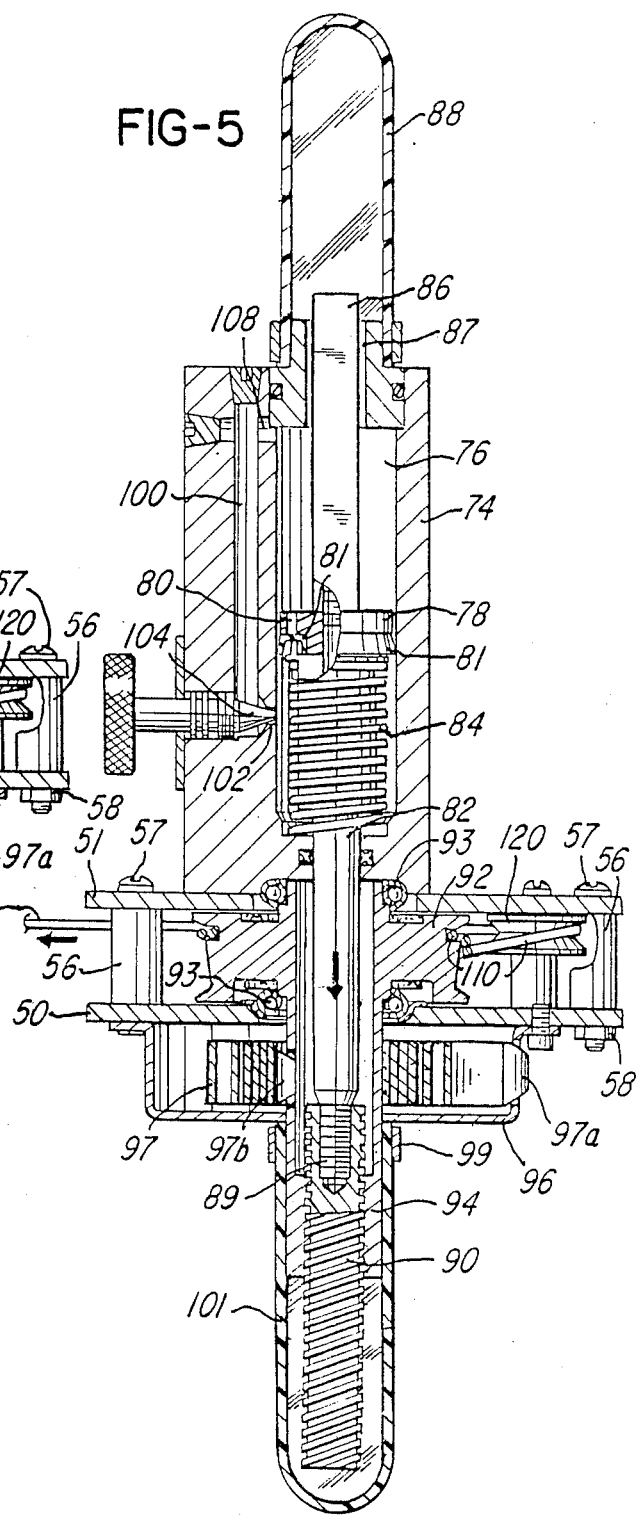

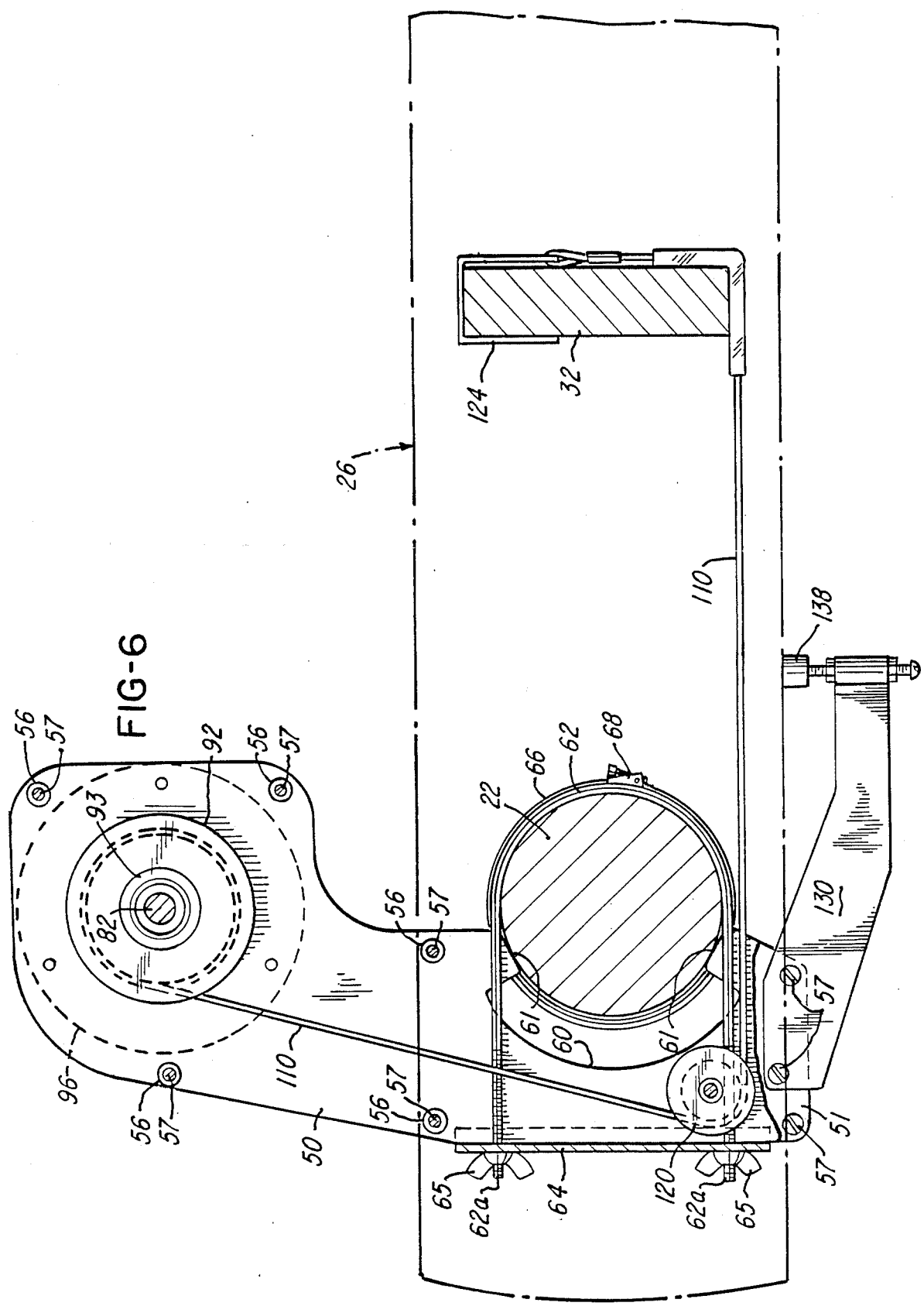

RADIAL ARM SAW CONTROL MECHANISM

BACKGROUND OF THE INVENTION

A radial arm saw is manually moved as the saw is supported upon an arm which extends radially from a support post. The saw has a rotating cutting blade. The saw is manually moved toward and away from the operator of the saw as the saw is operated. The cutting blade rotates in a direction which tends to move the saw outwardly upon the support arm and toward the operator. Therefore, the saw frequently tends to jump and/or to move unexpectedly quickly toward the operator during a cutting operation. Of course, such movement of the saw presents a dangerous condition for the operator.

It is an object of this invention to provide a control mechanism for a radial arm saw whereby the operator has complete control of the rate of movement of the saw during a cutting operation.

It is another object of this invention to provide such radial arm control mechanism which can be easily and readily installed on an existing radial arm saw assembly.

Another object of this invention is to provide such a radial arm saw control mechanism by which the rate of movement of a radial arm saw can be readily adjusted.

Another object of this invention is to provide such radial arm saw control mechanism which is dependable in operation and which is long lived.

Another object of this invention is to provide such a radial arm saw control mechanism which is relatively small in physical size, but which is capable of controlling a load of significant magnitude.

Other objects and advantages of this invention reside in the construction of parts, the combination thereof, the method of construction and the mode of operation, as will become more apparent from the following description.

U.S. Pat. Nos. 2,773,524, 3,090,269, and 4,590,831, describe radial arm saw control mechanisms. However, the means for control are different from that of this invention.

SUMMARY OF THE INVENTION

This invention comprises control mechanism for a radial arm saw. The control mechanism includes a housing. The housing is mounted adjacent a main support post of the radial arm saw assembly. Within the housing is a movable piston. Also, within the housing is a fluid which is engaged by the piston. The housing has a by-pass conduit which directs fluid from one side of the piston to the opposite side of the piston. When the piston moves in one direction fluid is forced by the piston for flow through the by-pass conduit.

The piston is attached to an axially movable shaft or piston rod. The piston rod has an extension portion which extends from the housing. A wheel is rotatably mounted adjacent the extension portion of the piston rod. The wheel has a threaded portion. The extension portion of the piston rod has a threaded portion which is in meshed threaded engagement with the threaded portion of the rotatable wheel. The wheel is encompassed by several convolutions of a cable or the like. The cable extends from the wheel to the saw which is supported by the radial arm of the assembly. When the saw is moved along the radial arm in a direction away from the central support post, the cable is drawn in a direction from the wheel, and the wheel is rotated by the cable. Rotation of the wheel and the threaded portion thereof forces the piston rod to move axially. Axial movement of the piston rod forces the piston to move axially against the pressure of the fluid in the housing. Thus, the movement of the saw is restrained by movement of the piston and by movement of the fluid into the by-pass conduit. The rate of movement of the piston is adjustably controlled by an adjustable valve which controls the volumetric rate of flow of fluid into the by-pass conduit.

A resilient member, such as a coil spring or the like, rotates the wheel in the reverse direction when the saw moves upon the radial arm toward the central support post. Also, a resilient member, such as a spring or the like, urges reverse movement of the piston when the saw moves upon the radial arm toward the central support post.

BRIEF DESCRIPTION OF THE VIEWS OF THE DRAWINGS

FIG. 1 is a perspective view of a radial arm saw assembly upon which saw control mechanism of this invention is mounted and attached to the saw.

FIG. 2 is a side elevational view, drawn on a larger scale than FIG. 1, showing the radial arm saw assembly of FIG. 1 and showing the saw control mechanism of this invention.

FIG. 3 is an enlarged view taken substantially on line 3—3 of FIG. 2.

FIG. 4 is an enlarged sectional view taken substantially on line 4—4 of FIG. 3. This view shows the restraint member of the control mechanism in a deactuated position.

FIG. 5 is an enlarged sectional view, similar to FIG. 4, and drawn on substantially the same scale as FIG. 4, and showing the restraint member in an operating position.

FIG. 6 is an enlarged sectional view, taken substantially on line 6—6 of FIG. 2.

DETAILED DESCRIPTION OF THE PREFERRED EMBODIMENT

Figure 7:
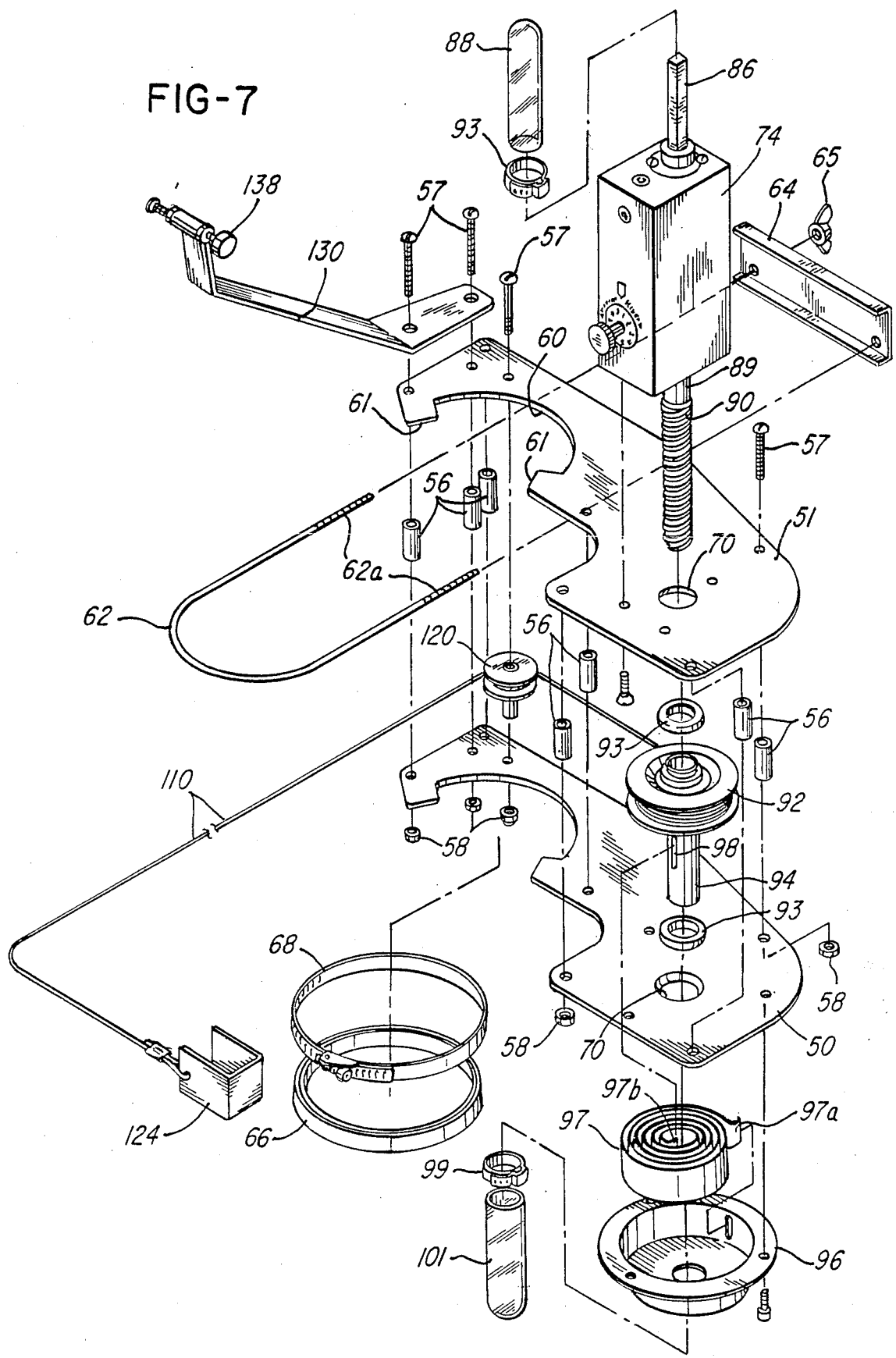
FIG. 7 is an exploded view of the restraint member of the control mechanism of this invention, drawn on substantially the same scale as FIGS. 4 and 5.

FIG. 1 shows a radial arm saw assembly 10, which is mounted upon a support structure 12. The radial arm saw assembly 10 includes a table 16. Attached to the support structure 12 and extending above the table 16 is a sleeve 20. Within the sleeve 20 is a post 22. The post 22 is axially movable within the sleeve 20. The post 22 has attached thereto at the upper portion thereof an arm 26. The arm 26 is pivotal about the axis of the post 22. The arm 26 is shown as being partially enclosed by a cover 30.

Movable along the arm 26 and supported by the arm 26 is a carriage 32. Rotatably supported by the carriage 32 is a saw member 38. The saw member 38 and the carriage 32 comprise a saw unit. Partially enclosing the saw member 38 is a cover 40. A tube 42 extends from the cover 40 for discharging saw dust and chips which are formed by operation of the saw member 38. Attached to the carriage 32 is a handle 44, which is adapted to be grasped by an operator of the saw member 38 for movement of the saw member 38 along the arm 26.

The control mechanism of this invention comprises a generally flat lower base member 50 and a generally flat upper base member 51, as best shown in FIG. 7.

The base members 50 and 51 are substantially identical and are spaced apart and attached together in substantially parallel relationship by means of spacers 56. Bolts 57 extend through the base members 50 and 51 and through the spacers 56 and have attached thereto nuts 58 which, with the bolts 57, secure together the base members 50 and 51.

Each of the base members 50 and 51 has an arcuate portion 60 which partially encompasses the post 22. A U-shape yoke 62 also partially encompasses the post 22 and extends between the base members 50 and 51 and has threaded end portions 62a which extend through an attachment member 64. Attached to the threaded end portions are nuts 65, which secure the U-shape yoke 62 to the attachment member 64 and which secure the yoke 62 to the post 22. Thus, the yoke 62 attaches the base members 50 and 51 to the post 22. The yoke 62 snugly attaches the base members 50 and 51 to the post 22 but permits slidable rotative movement of the base members 50 and 51 upon the post 22.

As shown, the lower base member 50 is below the upper base member 51, as the base members 50 and 51 are attached to post 22. Below the base member 50 and attached to the post 22 is an engagement band 66 of flexible plastics material or the like. The band 66 encompasses at least a major portion of the circumference of the post 22. Within the band 66 is a clamping band 68. The clamping band 68 is of metal material or the like, and secures the engagement band 66 in firm engagement with the post 22.

The lower base member 50 rests upon the engagement band 66 and the clamping band 68. As the lower base member 50 rests upon the engagement band 66 and the clamping band 68, the yoke 62 and the base members 50 and 51 can pivotally move about the post 22 as the base members 50 and 51 are supported by the post 22.

Each of the base members 50 and 51 has an opening 70 therethrough. The openings 70 are in alignment. Mounted upon the base member 51 immediately above the openings 70 is a housing 74. Within the housing 74 is an elongate cavity 76. Within the cavity 76 is a piston 78. The piston 78 has a passage 80 therethrough. Closing the passage 80 is a check valve 81 which permits downward fluid flow through the passage 80, but prevents upward fluid flow through the passage 80. The piston 78 is attached to a piston rod 82, which extends downwardly from the piston 78 and through the openings 70 in the base members 50 and 51. Encompassing the piston rod 82 is an elongate coil spring 84, which engages the piston 78 and which also engages a bottom wall of the housing 74. The coil spring 84 urges the piston 78 upwardly within the cavity 76.

Attached to the piston 78 and extending upwardly therefrom is a stem 86. The stem 86 is shown as being rectangular and extends through a rectangular opening 87 in the upper part of the housing 74. Therefore, the stem 86 and the piston 78 are non-rotatable, and the piston rod 82 is non-rotatable, but axially movable. Attached to the upper part of the housing 74 and extending upwardly therefrom is a cover 88 which encloses the upper part of the stem 86.

The piston rod 82 has a lower end 89 which is threadedly attached to a threaded shaft 90. Encompassing the piston rod 82 between the base members 50 and 51 is a wheel 92. The wheel 92 is rotatably supported in bearings 93. The wheel 92 has a downwardly extending shaft extension 94 which has internal threads. The internal threads are in threaded meshed engagement with the threaded shaft 90, which is attached to the piston rod 82, as the threaded shaft 90 extends through the shaft extension 94.

Below the lower base member 50 is an enclosure 96 which is attached to the lower base member 50. Within the enclosure 96 is a coil spring 97 which has an end 97a which is attached to the enclosure 96. The coil spring 97 also has an opposite end 97b within a slot 98 in the shaft extension 94. The slot 98 is best shown in FIG. 7. Immediately below the enclosure 96 is a band 99 which attaches a cover member 101 to the shaft extension 94.

As shown in FIGS. 4 and 5, the housing 74 has an elongate passage or conduit 100, which is adjacent the cavity 76 and which extends along the cavity 76. An orifice 102 provides fluid communication between the passage 100 and the cavity 76 at the lower portion of the cavity 76. A valve 104 is positioned within the orifice 102 and is adjustable within the orifice 102 to control the rate of volumetric fluid flow through the orifice 102. An orifice 108 provides fluid communication between the passage 100 and the cavity 76 at the upper portion of the cavity 76.

As best shown in FIG. 4, several convolutions of a cable 110 encompass the wheel 92. The cable 110 has an end portion attached to the wheel 92. The cable 110 extends from the wheel 92, around a part of the post 22, to a sheave 120, as best shown in FIG. 6. The cable 110 extends from the sheave 120 to a connector member 124. The connector member 124 is releasably attached to, and partially encompasses, a portion of the carriage 32.

Attached to the upper base member 51 and extending laterally therefrom is a limb 130. An engagement member 138 is attached to the end portion of the limb 130 and engages the arm 26. Thus, the base members 50 and 51 are pivotally moved upon the post 22 as the arm 26 pivotally moves upon the post 22.

Operation

During a cutting operation an operator grasps the handle 44, shown in FIG. 1, and draws the carriage 32 and the saw member 38 toward the operator. The saw member 38 cuts a board or the like which is positioned upon the table 16. As the carriage 32 and the saw member 38 are moved toward the operator and away from the post 22, successive portions of the cable 110 are drawn by the carriage 32 in a direction from the post 22. The cable 110 thus causes rotative movement of the sheave 120 as successive portions of the cable 110 move in engagement with the sheave 120. The cable 110 thus causes rotative movement of the wheel 92 as successive portions of the cable 110 unwind from the wheel 92 and move from the wheel 92. Thus, as the carriage 32 and the saw member 38 move in a direction from the post 22, the wheel 92 is rotated.

As shown and as stated above, the shaft extension 94 is attached to the wheel 92. The shaft extension 94 has internal threads which are in meshed relationship with the threaded shaft 90. Due to the fact that the piston rod 82 is non-rotatable, the threaded shaft 90 is non-rotatable. Therefore, as the wheel 92 rotates, the threaded shaft 90 and the piston rod 82 are moved downwardly. Downward movement of the piston rod 82 moves the piston 78 downwardly. Downward movement of the piston 78 forces downward movement of the fluid within the cavity 76. The fluid flows from the cavity 76 into the orifice 102 and into the passage 100. The rate of volumetric flow of the fluid from the cavity 76 through the orifice 102 is governed by the adjusted position of the valve 104 within the orifice 102. The fluid flows into the passage 100 and upwardly through the passage or conduit 100 and through the orifice 108 and into the cavity 76 above the piston 78. The fluid can flow downwardly through the passage 80 in the piston 78. The check valve 81 within the passage 80 permits downward flow of fluid through the passage 80 and through the piston 78. Thus, fluid flows from a position above the piston 78 to a position below the piston 78.

Due to the fact that the volumetric rate of flow of fluid from the cavity 76 into the passage 100 is controlled by the valve 104 within the orifice 102, the rate of rotation of the wheel 92 is controlled by the valve 104. Thus, the rate of travel of the cable 110 from the wheel 92 is controlled by the valve 104. Thus, the rate of movement of the carriage 32 and the saw member 38 in a direction from the post 22 is controlled by the adjusted position of the valve 104 within the orifice 102. The rate of movement of the saw member 38 during cutting action is thus controlled by the adjusted position of the valve 104.

When the saw member 38 and the carriage 32 are moved toward the post 22, the coil spring 97 urges rotative movement of the wheel 92 in a direction to draw the cable 110 toward the wheel 92. Thus, the cable 110 winds upon the wheel 92 as the saw 38 and the carriage 32 are moved toward the post 22. Also, as the wheel 92 is rotated in a direction to wind the cable 110 upon the wheel 92, the spring 84 forces the piston 78 upwardly. Thus, the piston rod 82 and the piston 78 are moved upwardly.

Thus, it is understood that the radial arm saw control mechanism of this invention provides means by which the rate at which a saw travels on a radial arm can be adjustably and accurately controlled. Thus, danger to the operator is significantly reduced. Furthermore, the cutting operation of the saw may be enhanced.

Although the preferred embodiment of the radial arm saw control mechanism of this invention has been described, it will be understood that within the purview of this invention various changes may be made in the form, details, proportion and arrangement of parts, the combination thereof, and the mode of operation, which generally stated consist in a radial arm saw control mechanism within the scope of the appended claims.

The invention having thus been described, the following is claimed:

1. A saw control mechanism for a radial arm saw assembly provided with an upwardly extending support post, an elongate arm supported by the support post and pivotally movable about the central axis of the support post, a saw unit supported by the arm and movable along the arm, comprising:

a base member, connection means attaching the base member to the support post, a housing attached to the base member, the housing having a cavity therein, the cavity having a first portion and a second portion, a piston within the cavity and axially movable within the cavity between the first portion and the second portion of the cavity, a piston rod attached to the piston and axially movable with the piston, a threaded shaft operably attached to the piston rod and axially movable therewith, a wheel rotatably supported by the base member, threaded means joining the wheel to the threaded shaft for axial movement of the threaded shaft with rotative movement of the wheel, a cable encompassing the wheel and extending therefrom, means attaching the cable to the saw unit, a by-pass conduit joining the first portion and the second portion of the cavity, the cavity and the conduit being adapted to contain fluid and to provide for flow of fluid therethrough, whereby movement of the saw unit along the arm draws successive portions of the cable from the wheel, whereby the wheel is forced to rotate as successive portions of the cable are drawn from the wheel, whereby rotation of the wheel rotates the threaded means, whereby rotation of the threaded means forces axial movement of the threaded shaft and forces axial movement of the piston rod and axial movement of the piston, whereby axial movement of the piston forces movement of the fluid within the cavity as the fluid flows from the first portion of the cavity through the conduit and to the second portion of the cavity, whereby the rate of movement of the saw unit along the arm is controlled by the rate of flow of fluid from the cavity into the first portion of the by-pass conduit.

2. The saw control mechanism of claim 1 which includes a valve positioned for controlling the rate of flow of fluid through the by-pass conduit.

3. The saw control mechanism of claim 1 which includes an adjustable valve positioned to control flow of fluid from the cavity and into the first portion of the by-pass conduit.

4. The saw control mechanism of claim 1 which includes resilient means positioned to urge axial movement of the piston.

5. The saw control mechanism of claim 1 which includes resilient means positioned to urge rotative movement of the wheel.

6. The saw control mechanism of claim 1 which includes a sheave positioned adjacent the post, the cable extending from the wheel to the sheave and in engagement with the sheave, and the cable then extending from the sheave to the means attaching the cable to the saw unit.

7. The saw control mechanism of claim 1 in which the connection means attaching the base member to the post includes means slidably attaching the base member to the post for slidable movement of the base member with respect to the post.

8. The saw control mechanism of claim 1 in which the connection means attaching the base member to the post includes means slidably attaching the base member to the post, and securing means clamped to the post and supporting the base member for pivotal sliding movement of the base member upon the post.

9. Saw control mechanism for a radial arm saw assembly of the type provided with an upwardly extending support post, an elongate arm supported by the post, a saw unit supported upon the elongate arm and movable along the arm, comprising a base member, attachment means attaching the base member to the post for support by the post, a housing attached to the base member for support of the housing by the base member, the housing being provided with an elongate cavity, the cavity being adapted to contain fluid, the cavity having a first portion and a second portion, the housing also having a passage adjacent the cavity and in fluid communication with the first portion of the cavity and the second portion of the cavity, an orifice joining the first portion of the cavity to the passage, a valve adjustable within the orifice for adjustably controlling the rate of flow of fluid from the first portion of the cavity to the passage, a piston within the cavity and axially movable within the cavity, a piston rod attached to the piston and axially movable with the piston, the piston rod extending from the cavity and including a threaded portion, a wheel rotatably supported by the base member, a threaded member attached to the wheel, the threaded member being in threaded meshed engagement with the threaded portion of the piston rod, a cable wound upon the wheel and extending therefrom, means attaching the cable to the saw unit, whereby movement of the saw unit in a direction from the post forces movement of the cable as the cable partially unwinds from the wheel and forces rotation of the wheel, whereby rotation of the wheel forces rotation of the threaded member, whereby rotation of the threaded member forces axial movement of the threaded portion of the piston rod and axial movement of the piston rod and axial movement of the piston, axial movement of the piston forcing movement of fluid in the cavity and forcing flow of fluid from the first portion of the cavity through the orifice and into the passage, the valve controlling the rate of flow of fluid from the cavity and thus controlling the rate of movement of the piston and thus controlling the rate of rotation of the wheel and thus controlling the rate of travel of the cable and thus controlling the rate of travel of the saw unit upon the arm.

10. The saw control mechanism of claim 9 which includes resilient means urging rotation of the wheel in a direction to wind the cable upon the wheel.

11. The saw control mechanism of claim 9 which includes resilient means urging axial movement of the piston and piston rod.

12. The saw control mechanism of claim 9 in which the piston has an opening therethrough, a check valve within the opening and permitting flow of fluid in a given direction through the opening.

13. Saw movement control mechanism for a radial arm saw assembly of the type provided with a substantially vertical post, a substantially horizontal arm supported by the post and extending therefrom, the arm being angularly movable about the vertical axis of the post, a saw unit supported by the arm and movable along the arm, comprising a base member, connection means attaching the base member to the post for pivotal movement of the base member upon the post, a housing attached to the base member for support of the housing by the base member, the housing having a cavity provided with a first portion and a second portion, there being a first port at the first portion of the cavity, there being a second port at the second portion of the cavity, a piston within the cavity and movable between the first portion of the cavity and the second portion of the cavity, a resilient member engaging the piston and urging movement thereof toward the first portion of the cavity, a conduit extending between the first portion and the second portion of the cavity and in communication therewith, the cavity and the conduit being adapted to contain fluid, the ports providing fluid communication between the cavity and the conduit, a piston rod attached to the piston and extending from the cavity, the piston rod including a threaded section exterior of the cavity, a wheel rotatably supported by the base member, a shaft having a hollow portion, the shaft being attached to the wheel, the hollow portion of the shaft having internal threads, the threaded section of the piston rod being within the hollow portion of the shaft and in meshed engagement with the internal threads of the hollow portion of the shaft, a coil spring encompassing the shaft and urging rotative movement of the shaft and the wheel, a cable having a portion wound upon the wheel and a portion extending from the wheel, the cable having an attachment portion attachable to the saw unit, the saw unit being movable upon the arm in a direction away from the post, movement of the saw unit in a direction from the post forcing movement of portions of the cable from the wheel and forcing rotative movement of the wheel, whereby the shaft is rotated, and the piston rod and the piston are moved axially in a direction from the first portion of the cavity and toward the second portion of the cavity, whereby fluid is forced through the second port and into the conduit, whereby the rate of travel of the piston is controlled by the volumetric rate of flow of the fluid from the cavity and through the second port, the rate of rotation of the wheel thus being controlled by the volumetric rate of flow of the fluid from the cavity through the second port, the rate of travel of portions of the cable and the saw unit thus being controlled by the volumetric rate of flow of the fluid from the cavity and through the second port.

14. Saw movement control mechanism of the type provided with an elongate arm, a saw unit movable upon the elongate arm, comprising: a housing, there being fluid within the housing, axially movable means engaging the fluid within the housing and moving fluid within the housing, whereby the rate of flow of the fluid which is engaged by the axially movable means controls the rate of axial movement of the axially movable means, rotative means operably joined to the axially movable means for simultaneous rotative movement of the rotative means and axial movement of the axially movable means, cable means operably joined to the rotative means and adapted to be connected to the saw unit, whereby movement of the saw unit moves portions of the cable means and rotatively moves the rotative means, whereby rotation of the rotative means forces axial movement of the axially movable means and moves the fluid, and axial movement of the axially movable means thus controls movement of the rotative means and the cable means and controls movement of the saw unit.

15. Saw movement control mechanism for a radial arm saw assembly of the type having an elongate substantially vertical post, an arm supported by the post and pivotally movable about the central axis of the post, a saw unit supported by the arm and movable along the arm, comprising: a support member attached to the post, a housing attached to the support member, the housing having a cavity, the cavity having an outlet opening, a piston within the cavity and axially movable within the cavity, a piston rod attached to the piston and axially movable with the piston, the piston rod having a threaded extension portion exterior of the cavity, a rotatable wheel rotatably supported by the support member, a threaded member attached to the wheel and threadedly joining the wheel to the threaded extension portion of the piston rod, whereby the threaded member is in meshed relationship with the threaded extension portion of the piston rod, a cable wound upon the wheel and extending therefrom, the cable extending from the wheel to the saw unit and attachable to the saw unit, whereby movement of the saw unit in a direction from the post forces movement of portions of the cable as portions of the cable unwind from the wheel and rotate the wheel, whereby rotation of the wheel forces axial movement of the piston rod and axial movement of the piston and forces fluid from the cavity through the outlet opening, the wheel and the cable thus moving at a rate in accordance with the rate of movement of the piston as the piston forces fluid flow from the cavity through the outlet opening.

16. The saw movement control mechanism of claim 15 which includes means limiting movement of the piston rod to axial movement.

17. The saw movement control mechanism of claim 15 which includes means within the outlet opening for adjustably controlling flow of fluid through the outlet opening.

18. The saw movement control mechanism of claim 15 which includes means pivotally attaching the support member to the post, and which includes a limb extending from the base member and in engagement with the arm for pivotal movement of the support member with pivotal movement of the arm.

19. The saw movement control mechanism of claim 15 in which a shaft extension member is joined to the wheel and is provided with internal threads, and in which the threaded extension portion of the piston rod extends through the shaft extension member and is in threaded meshed relation with the internal threads of the extension portion.

20. The saw movement control mechanism of claim 15 which includes means pivotally attaching the support member to the post and which includes bearing means clamped to the post and supporting the support member for pivotal movement of the support member upon the post.

21. The saw movement control mechanism of claim 15 which includes a sheave rotatably supported by the support member and engageable by the cable between the wheel and the saw unit, the sheave thus directing the cable in its travel from and to the wheel to the saw unit.

22. The saw movement control mechanism of claim 15 which includes a cover member attached to the support member, a coil spring within the cover member, the coil spring having an end portion in engagement with the cover member and an end portion in engagement with the threaded member.

23. The saw movement control mechanism of claim 15 in which the threaded member comprises a hollow shaft provided with an internal threaded portion and in which the threaded extension portion of the piston rod extends through the hollow shaft, and whereby the threaded extension portion of the piston rod is in threaded meshed relationship with the internal threaded portion of the hollow shaft.

24. The saw movement control mechanism of claim 15 which includes a resilient member within the cavity and in engagement with the piston and urging movement of the piston.

25. The saw movement control mechanism of claim 15 which includes resilient means urging axial movement of the piston and rotative movement of the wheel.

26. Saw movement control mechanism for saw apparatus of the type provided with an elongate arm, a saw unit movable upon the elongate arm, comprising: rotatable wheel means, a housing containing fluid, fluid engagement means within the housing and in engagement with the fluid, the fluid engagement means being movable to move fluid within the housing, the rate of movement of the fluid engagement means being controlled by the rate of movement of the fluid, means operably joining the wheel means to the fluid engagement means, cable means operably joined to the wheel means for rotation of the wheel means, the cable means being adapted to be connected to the saw unit, whereby the rate of movement of the saw unit upon the elongate arm is controlled by the rate of movement of the cable means, and the rate of movement of the cable means is controlled by the rate of rotative movement of the wheel means, and the rate of rotative movement of the wheel means is controlled by the rate of movement of the fluid engagement means.

* * * * *